United States Patent Office 3,306,157
Patented Feb. 28, 1967

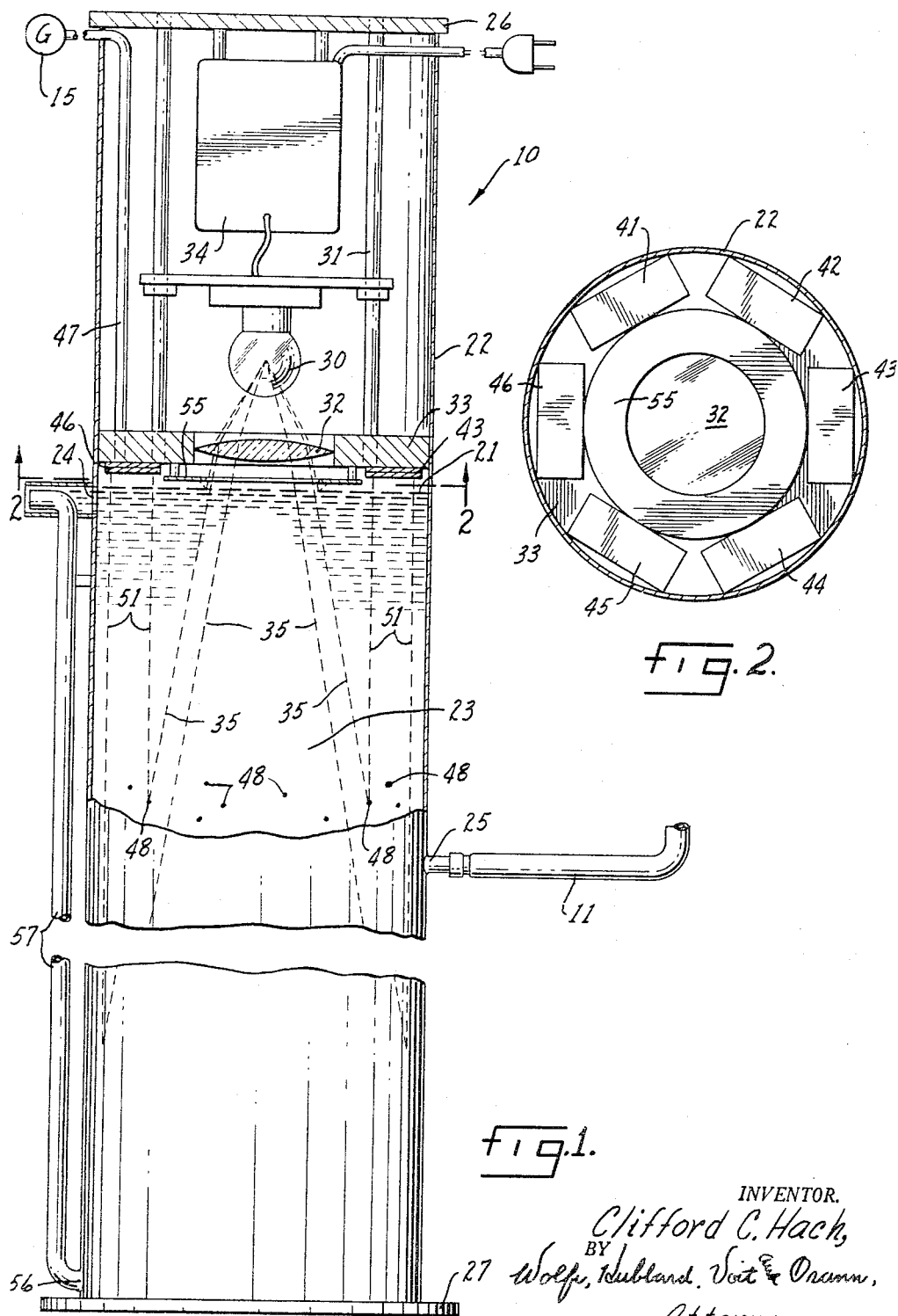

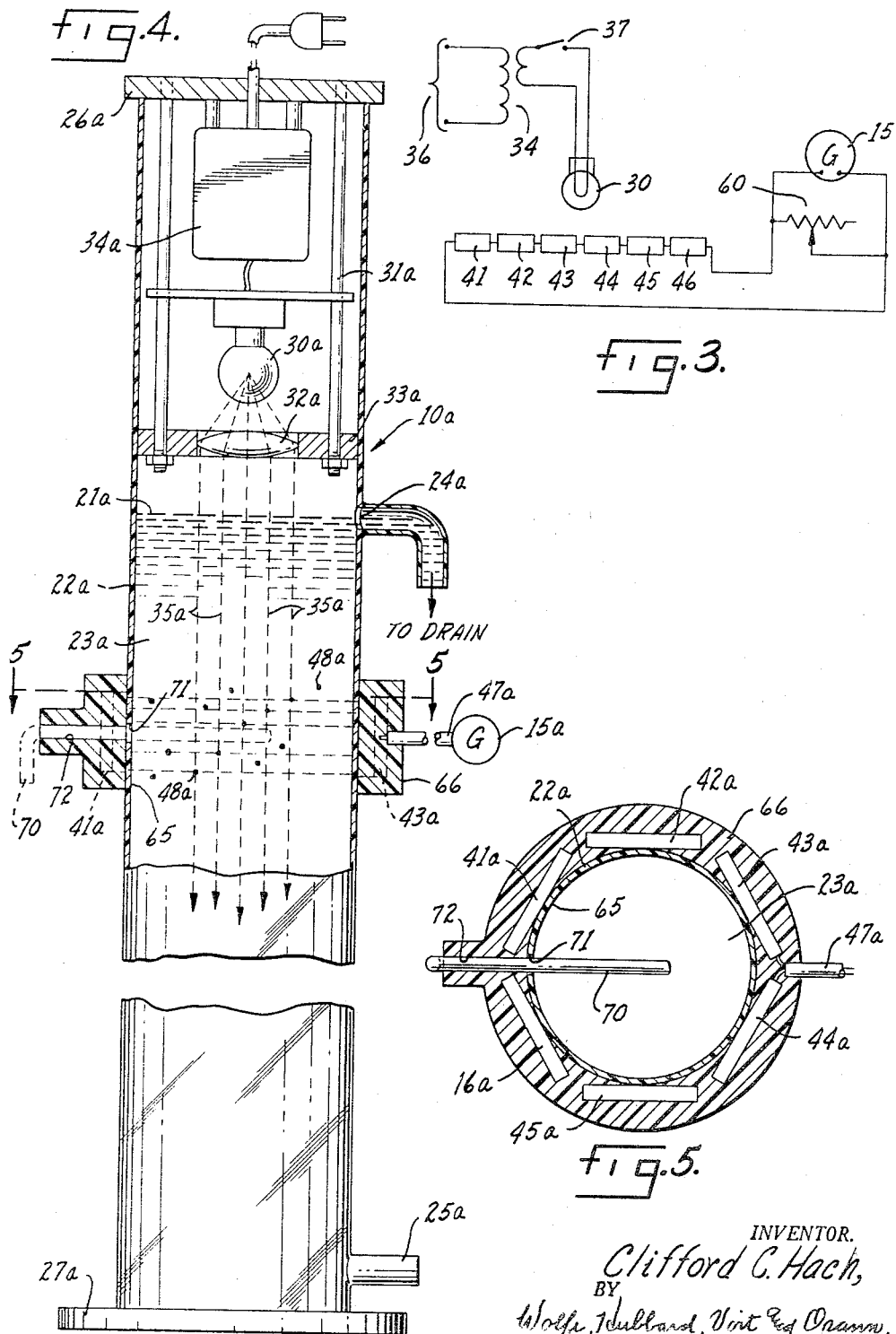

3,306,157
TURBIDIMETER FOR SENSING THE TURBIDITY OF A CONTINUOUSLY FLOWING SAMPLE
Clifford C. Hach, Ames, Iowa, assignor to Hach Chemical Company, Ames, Iowa, a corporation of Iowa
Original application Dec. 15, 1959, Ser. No. 859,691. Divided and this application Nov. 19, 1962, Ser. No. 238,699
1 Claim. (Cl. 88—14)

The present invention relates to instruments for measuring the turbidity of fluids, known as turbidimeters, and concerns more particularly a photoelectric turbidimeter for testing continuously flowing fluid samples.

This application is a division of my co-pending application Ser. No. 859,691, filed December 15, 1959, now abandoned.

It is the primary aim of the invention to provide a very accurate turbidity sensive instrument which operates with complete reliability and uniform accuracy over long periods of continuous use.

In more detail, it is an object of the invention to provide a turbidimeter as described above which measures turbidity in terms of light reflected from a light beam introduced into the test fluid through a continuously moving fluid surface without interposed windows or the like, so that the intensity of the light beam remains constant and the instrument remains uniformly accurate.

It is also an object to provide a turbidimeter of the above character which is simple and rugged in design and hence is both economical to manufacture and very well suited for demanding industrial and municipal use.

In one of its aspects, it is an object of the invention to provide a high range turbidimeter having the above characteristics that is especially well suited for measuring turbidity in very turbid fluids with uniform accuracy and with no routine cleaning required as is normally called for when heavily turbid fluids are sensed photoelectrically.

In another aspect of the invention, it is an object to provide a low range turbidimeter particularly well suited for sensing turbidity in very slightly turbid fluids because of the exceptional sensitvity of the instrument. It is another object to provide a method and means that is simple and economical for reliably and accurately calibrating a very low range turbidimeter.

Other objects and advantages of the invention will become apparent upon reading the following detailed description and upon reference to the drawings, in which:

FIGURE 1 is a vertical section of a turbidimeter constructed in accordance with the invention;

FIG. 2 is a section taken approximately along the line 2—2 in FIG. 1;

FIG. 3 is a diagrammatic representation of the electrical circuit embodiment in the turbidimeter shown in FIG. 1;

FIG. 4 is a vertical section of a second modification of a turbidimeter embodying the invention; and FIG. 5 is a section taken approximately along the line 5—5 of FIG. 4.

While the invention will be described in connection with certain preferred embodiments and procedures it will be understood that I do not intend to limit the invention to those embodiments or procedures. On the contrary, I intend to cover all alternatives, modifications and equivalents as may be included within the spirit and scope of the appended claims.

Turning now to FIG. 1, there is shown a turbidimeter embodying the invention and arranged to measure the turbidity of a supply of fluid introduced to the instrument through a conduit 11. The turbidimeter 10 is of the photoelectric type in which the turbidity of the fluid is tested by passing a beam of light into a fluid sample and measuring the effect on the light beam in terms of light energy striking photoelectric cells. In the illustrated embodiment, the turbidity of the fluid sample introduced through conduit 11 is read directly by coupling the output of the turbidimeter photoelectric cells to a galvanometer 15 which is adapted, in the manner described below, to directly indicate the turbidity of the test sample in terms of standard turbidity units. Since the output of the turbidimeter is electrical, it will be understood that a continuous recorder or other electrically energized instrument may be utilized in place of the gavanometer 15 to indicate and/or record the turbidity of the fluid being tested.

In accordance with the present invention, the turbidimeter 10 establishes a continuously moving, smooth fluid surface on the sample under test through which a light beam is directed, and photoelectric cells are disposed out of the path of the light beam so that the electrical output of the cells is dependent upon the amount of light energy from the beam that is reflected toward the cells by particles suspended in the fluid. No window or other light or transmitting device is interposed between the light beam source and the fluid sample under test which could become fouled or filmed over after long periods of use. Since the fluid surface through which the light beam is passed into the test sample is smooth and continuously moving, there is little distortion of the light beam and no surface film accumulation to mask the light and thus vary the intensity of the light introduced into the fluid.

In the embodiment shown in FIG. 1, a continuously moving, smooth fluid upper surface 21 is established by providing a container 22 that supports a vertical column 23 of the fluid to be tested and which is provided with an upper drain opening 24 allowing fluid to freely drain from the container. The conduit 11 is opened into the container at a connection 25 well below the upper surface 21, and the fluid being tested is introduced through the conduit 11 at a constant rate so that the upper surface 21 of the fluid column 23 remains at a constant height. The rate of flow of the fluid sample is selected so that the fluid at the surface 21 flows steadily through the drain opening 24 with the result that the surface 21 is defined by smooth surfaced, continuously moving fluid.

In the preferred construction, the container 22 is tubular in form (see FIG. 2) and is provided with head and base plates 26 and 27 respectively. With a container having an inside diameter of approximately 6 inches, a flow rate of about one-half gallon per minute with a head of 6 inches or more has been found to produce a desirably stable upper surface 21.

For directing a light beam through the surface 21 into the fluid sample, a light source is mounted within the container 22 above the fluid column 23. The light source preferably includes a precision, constant intensity lamp 30 supported by a bracket 31 above a focusing lens 32 that is mounted in an annular plate 33. A transformer 34, mounted on the head plate 26, is provided to produce an appropriate a voltage to excite the lamp 30. The lamp and lens 32 are positioned so as to direct a beam of light, typical rays 35 of which are indicated by dashed lines, through the upper fluid surface 21 and down into the fluid sample. In operation, the transformer 34 is coupled to a source of A.-C. current 36 and, preferably, a switch 37 is provided to control the operation of the lamp 30 (see FIG. 3).

The FIG. 1 embodiment being described is a high range instrument, that is, one primarily intended for testing very turbid fluids. To facilitate the photoelectric testing of high range turbidity, the cells of the turbidimeter are arranged so that the measuring light both enters and leaves the fluid sample through the upper surface 21. In the preferred construction, six photoelectric cells 41–46 are arranged in a ring on the bottom of the plate 33 around the lens 32. The photoelectric cells are out of the direct path of the light beam represented by the rays 35 and are disposed so as to face the fluid column 23. Preferably, these cells are of the ordinary selenium type and are electrically coupled in series with an output conductor 47 being connected to the galvanometer 15.

In operation, the light beam represented by the rays 35 enters the fluid test sample through the smooth, continuously flowing upper fluid surface 21, and a certain proportion of the light energy strikes and is reflected by turbidity particles 48 suspended in the fluid under test. The greater the number of particles, that is, the more turbid the fluid, the more light energy is reflected. Hence the electrical output of the photoelectric cells 41–46 is directly dependent upon the turbidity of the fluid in the column 23.

So as to minimize the effect of surface reflection as the light leaves the fluid test sample through the upper surface 21, the lens 32 and lamp 30 are arranged to create a slightly diverging beam of light as indicated by the diverging rays 35 so that the turbidity particles 48 directly beneath the cells 41–46 are illuminated. As a result, the reflected light, indicated by the rays 51, which strike the photoelectric cells leave the fluid test sample perpendicular to the upper surface 21 and are therefore not reflected or refracted as would be the case if the rays left the fluid at an angle from the perpendicular. The radiant energy detected by the photoelectric cells is thus all of the light reflected upwardly toward the cells by the illuminated particles and not merely a proportioned part of that light as reduced by losses caused by reflection or refraction. In this way, the effects of varying reflection or refraction losses are eliminated and an accurate measurement of the level of turbidity in the fluid under test is obtained.

In order to avoid the effect of surface reflection as the diverging beam of light enters the fluid through the upper surface 21, an annular shield 55 is mounted on the plate 33 between the lens 32 and the ring of cells 41–46. Preferably, the shield 55 is provided with a black or other light absorbent surface finish. As can be seen in FIG. 1, that portion of the light beam represented by the rays 35 which is reflected upwardly from the smooth upper fluid surface 21 is trapped or blocked by the shield 55 and prevented from impinging upon the photoelectric cells surrounding the lens. Thus, suface reflection does not produce a false indication of turbidity.

To keep the fluid column 23 a true sample of the fluid under test, a drain opening 56 is provided at the bottom of the fluid column and a conduit 57 is extended from the opening 56 up to the level of the upper drain opening 24. In this way a substantially equal amount of fluid is drained from the container 22 at the top and bottom of the fluid column 23 and, as a result, a substantially uniform flow of test fluid is established from the intake opening 25 to both of the drain openings 24 and 56. The fluid flow moving both up and down in the fluid column 23 avoids any tendency for the suspended turbidity particles in the fluid column to settle or concentrate at one point within the container 22 so as to produce a false sample of the fluid under test.

So that the turbidity of the test sample can be read directly in standard turbidity units, the output of the photoelectric cells 41–46 is shunted by an adjustable electrical resistance 60 (see FIG. 3). It is therefore possible to "standardize" the galvanometer 15, or other indicating or recording device, so that it will read directly, in standard turbidity units, the turbidity of the fluid sample being tested by the turbidimeter. Standardization is preferably accomplished by first testing a clear, non-turbid fluid such as distilled water. During the test of this sample the galvanometer 15, or equivalent recording unit, is adjusted to a zero reading. Then, a fluid sample of known turbidity as determined by test with a Jackson standard candle is run through the turbidimeter 10 so as to produce an output from the photoelectric cells 41–46. The variable resistance 60 is then adjusted so that the cell output causes a reading on the galvanometer or equivalent device that is equal to the known turbidity or the test sample. The relationship between the turbidity of the fluid under test and the electrical output of the photoelectric cells 41–46 is a straight line one, and therefore after the instrument is standardized with a sample of known turbidity as described above, the turbidity of subsequent test samples can be read directly in standard units on the galvanometer or equivalent instrument.

While the FIG. 1 embodiment is primarily a high range instrument, the turbidimeter 10a illustrated in FIGS. 4 and 5 and also embodying the invention is principally a low range turbidimeter that is particularly sensitive and hence well suited for accurate testing in very low turbidity ranges. In describing this second embodiment of the invention, elements similar to those described above have been given identical reference numerals with the distinguishing suffix a added.

The turbidimeter 10a establishes a smooth, continuously moving, upper fluid surface 21a by supporting a column 23a of fluid to be tested within a container 22a having an upper drain opening 24a. Fluid is continuously transmitted to the turbidimeter 10a through an intake opening 25a. The container 22a is tubular in form and is provided with head and base plates 26a and 27a, respectively.

Providing a source of light is a precision, constant intensity lamp 30a that is mounted on a bracket 31a and which cooperates with a lens 32a supported on an annular plate 33a. The lamp is exited by electrical current provided at the proper voltage by a transformer 34a.

In keeping with the invention, the photoelectric cells of the sensitive, low range turbidimeter 10a are arranged to take advantage of side reflectance from the turbidity particles 48a in the fluid being tested and to avoid energy losses occasioned by the reflected light passing back through the upper fluid surface 21a. To accomplish this, the container 22a is formed with a transparent portion 65 disposed beneath the upper fluid surface 21a, and photoelectric cells 41a–46a are disposed adjacent the transparent portion 65 facing the fluid column 23a.

In the preferred construction, the entire container 22a is formed of transparent plastic tubing rendered opaque by painting and the photoelectric cells 41a–46a are encased in a band 66 which surrounds the annular transparent portion 65 of the container which is left unpainted. The photoelectric cells are coupled in series and are connected by a line 47a to a galvanometer 15a.

In operation, the turbidimeter 10a senses turbidity in the fluid column 23a by directing a beam of light representative by rays 35a down into the fluid column through the upper surface 21a. A portion of the light striking the particles 48a suspended in the fluid column is reflected laterally toward the phototelectric cells 41a–46a to cause an electrical output that is detected by the galvanometer 15a. Since side reflection is considerably more intense than back reflection, the turbidimeter 10a is capable of reacting to fluid turbidity in much lower ranges than is the turbidimeter 10. However, in each embodiment of the invention, particle illumination of constant intensity and direction is reliably obtained by directing the light beams represented by the rays 35 and 35a into the fluid through the smooth, constantly flowing upper fluid surfaces 21 and 21a, respectively.

As the turbidimeter 10a is preferably utilized to test low turbidity fluids, it has been found that the amount of filming over or fouling of the transparent portion 65 through which the light leaves the fluid column to strike the photoelectric cells 41a–46a is quite insignificant. Experience with commercial instruments embodying this form of the invention has indicated that a routine cleaning once or twice a year of an instrument that is in constant use is sufficient to maintain optimum efficiency and accuracy.

Returning to the FIG. 4 embodiment, the effect of surface reflection as the light enters the upper fluid surface 21a is minimized by arranging the lamp 30a and the lens 32a to create a beam of light having substantially parallel days 35a which passes through the fluid surface 21a in a direction approximately perpendicular to that surface. This minimizes the effects of reflection and refraction as the light passes through the surface 21a and also insures that the rays 35a of the light beam do not directly impings upon any one of the photoelectric cells 41a–46a.

As a feature of the invention, the turbidimeter 10a is standardized for indicating directly, in standard turbidity units, the turbidity of fluids in very low turbidity ranges by using an easily handled reflecting member having a known reflectance when introduced into the instrument. In the preferred method, a stainless steel rod 70 is utilized as a reflecting member and an opening 71 is provided on the side of the container 22a to permit the rod 70 to be inserted into the fluid column 23a at the level of the photoelectric cells 41a–46a. To prevent leakage of the test sample through the opening 71, the band 66 is sealed about the opening and is provided with a passage 72 leading thereto. The walls of the passage 72 are softly resilient so that they spread easily upon inserting of the rod 70 (see FIG. 4) and spring back to seal the passage when the rod is withdrawn.

In employing the rod 70 to standardize the turbidimeter 10a, the instrument is first charged with a non-turbid fluid and, with the lamp 30a in operation, the galvanometer 15a is adjusted to a zero reading. When the stainless steel rod 70 is interposed in the beam of light represented by the rays 35a, it will be understood that a certain predetermined amount of light will be reflected toward the photoelectric cells 41a–46a. The amount of light reflected by the rod will be a constant and can be correlated to a known level of turbidity which produces a corresponding amount of reflected light. Having predetermined the reflectance of the rod 70, the rod is inserted into the fluid column 23a and an adjustable resistance shunt, corresponding to the shunt 60 for the turbidimeter 10, is adjusted so that the galvanometer 15a reads the number of turbidity units previously determined to correspond to the amount of reflection caused by the standard rod.

Hence, standardization of the turbidimeter 10a simply involves inserting the rod 70 and making an appropriate adjustment of the electrical shunt across the output of the photoelectric cells of the instrument. This system of standardizing the turbidimeter has proven particularly advantageous for standardizing in very low turbidity ranges since it is difficult to obtain a reliably standardized test sample of low turbidity by the use of the conventional Jackson standard candle or equivalent device.

Once initial adjustment of the turbidimeter 10a is made, standardization can be conveniently checked by inserting the rod 70 into the fluid column while the turbidimeter is in operation. Since the reflectance of the rod is a known constant, the inserting of the rod should produce a given increase in the reading of the galvanometer 15a and if this increase is not noted an appropriate adjustment of the shunt is made. This method of standardization is particularly useful in a continuously operating system.

Those skilled in the art will appreciate that turbidimeters 10–10a embodying the present design are relatively simple in design and rugged in construction. Hence, these instruments are economical to manufacture and are very well suited for demanding industrial and municipal use. The turbidimeters 10 and 10a can be kept in constant use over long periods of time with very little maintenance. The turbidimeter 10, although utilized to test very turbid fluids, requires no routine cleaning. Occasional standardization of the galvanometer 15 or other recording device, and periodic replacement of the lamp 30, is the only maintenance necessary. The turbidimeter 10a, when used for its intended purpose of testing very low turbidity fluids, is likewise troublefree over long periods of constant operation and requires routine cleaning of the transparent portion 65 only once or twice a year.

I claim as my invention:

A turbidimeter for sensing the turbidity of a continuously flowing fluid sample comprising, in combination, a container for supporting a vertical column of fluid to be tested, means defining a drain opening in said container for establishing an upper surface on said fluid column by allowing fluid to freely drain from the column at the level of said upper surface, means for transmitting a continuous flow of said fluid to said column, a light source fixed relative to said container for directing a slightly diverging, circular beam of light down into said fluid through said upper surface, a ring of photoelectric cells surrounding said light beam and being disposed above and facing said upper fluid surface, the electrical output of said cells being dependent upon the amount of light energy from said light beam that is reflected toward the photoelectric cells by particles suspended in said fluid, and an annular shield disposed between said light beam and the photoelectric cells in said ring so as to intercept light reflected from said upper surface and thus prevent surface relectiton from affecting the electrical output of said cells.

References Cited by the Examiner

UNITED STATES PATENTS

| | | | |
|---|---|---|---|
| 1,810,739 | 6/1931 | Vedder | 88—14 |
| 1,917,379 | 7/1933 | Lowry | 88—14 |
| 1,969,626 | 8/1934 | Simon et al. | 88—14 |
| 2,215,211 | 9/1940 | Devol | 88—14 |
| 2,411,092 | 11/1946 | Hood et al. | |
| 2,436,262 | 2/1948 | Miller | 88—14 |
| 2,682,613 | 6/1954 | Uhl. | |
| 2,839,963 | 6/1958 | Moss et al. | 250—218 X |
| 2,852,693 | 9/1958 | Hughes | 88—14 X |
| 3,065,665 | 11/1962 | Akhtar et al. | 88—14 |

JEWELL H. PEDERSEN, *Primary Examiner.*

T. L. HUDSON, O. B. CHEW, *Assistant Examiners.*